United States Patent
Clark et al.

(10) Patent No.: US 11,022,441 B2
(45) Date of Patent: Jun. 1, 2021

(54) MARINE ELECTRONIC DEVICE FOR GENERATING A ROUTE BASED ON WATER DEPTH

(71) Applicant: NAVICO HOLDING AS, Egersund (NO)

(72) Inventors: Jeremiah D. Clark, Tulsa, OK (US); Gregory Iverson, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 373 days.

(21) Appl. No.: 16/101,814

(22) Filed: Aug. 13, 2018

(65) Prior Publication Data

US 2020/0049507 A1   Feb. 13, 2020

(51) Int. Cl.
| | | |
|---|---|---|
| *B63B 49/00* | (2006.01) | |
| *G01C 13/00* | (2006.01) | |
| *G01C 21/00* | (2006.01) | |
| *G01S 15/89* | (2006.01) | |
| *G01C 21/20* | (2006.01) | |
| *B63B 79/00* | (2020.01) | |

(Continued)

(52) U.S. Cl.
CPC ............ *G01C 21/203* (2013.01); *B63B 49/00* (2013.01); *G01C 13/008* (2013.01); *G01S 15/89* (2013.01); *B63B 79/00* (2020.01)

(58) Field of Classification Search
CPC .... G01C 21/203; G01C 13/008; G01C 13/00; B36B 49/00; B36B 71/00; B36B 79/00; B36B 79/10; B36B 79/15; B36B 79/20; B36B 79/30; B36B 79/40; G01S 7/6218; G01S 7/6263; G01S 7/6272; G01S 15/89
See application file for complete search history.

(56) References Cited

U.S. PATENT DOCUMENTS

| | | |
|---|---|---|
| 5,525,081 A | 6/1996 | Mardesich et al. |
| 7,268,703 B1 | 9/2007 | Kabel et al. |

(Continued)

FOREIGN PATENT DOCUMENTS

| | | | |
|---|---|---|---|
| AU | 2014375084 A1 | 8/2016 | |
| WO | WO-2015101834 A2 * | 7/2015 | ............ G01S 15/96 |

OTHER PUBLICATIONS

"Drew Cushing, Finding the Right Depth is Key to Catching Fish Through the Ice, Dec. 27, 2013, ETV News" (Year: 2013).*

(Continued)

*Primary Examiner* — Khoi H Tran
*Assistant Examiner* — Sarah A Tran
(74) *Attorney, Agent, or Firm* — Nelson Mullins Riley & Scarborough LLP

(57) ABSTRACT

A marine electronic device is provided including a user interface, a processor, and a memory having computer program code stored thereon. The memory and the computer program code are configured to, with the processor, cause the marine electronic device to receive a first user input defining a minimum water depth value for a route on a body of water, receive a second user input defining a maximum water depth value for the route, cause a chart to be displayed on the user interface, receive a third user input directed to the chart defining an ending point, and generate a continuous route from a starting location to an ending location corresponding to the ending point based on the maximum water depth value and the minimum water depth value.

16 Claims, 14 Drawing Sheets

(51) Int. Cl.
    *G01S 7/62*   (2006.01)
    *G01S 15/00*  (2020.01)

(56) References Cited

U.S. PATENT DOCUMENTS

| | | | |
|---|---|---|---|
| 8,543,269 | B1 | 9/2013 | Wood et al. |
| 8,645,012 | B2 | 2/2014 | Salmon et al. |
| 9,267,804 | B1* | 2/2016 | Steward ................ G01C 21/203 |
| 2006/0064242 | A1* | 3/2006 | Litvack ................ G01C 21/203 |
| | | | 701/410 |
| 2006/0089794 | A1* | 4/2006 | DePasqua ............ G01C 21/203 |
| | | | 701/532 |
| 2006/0191185 | A1* | 8/2006 | Hansen .................. A01K 91/08 |
| | | | 43/27.4 |
| 2008/0133131 | A1 | 6/2008 | Poreda et al. |
| 2012/0232719 | A1 | 9/2012 | Salmon et al. |
| 2013/0242700 | A1* | 9/2013 | Blake ...................... G01S 15/89 |
| | | | 367/88 |
| 2014/0200806 | A1 | 7/2014 | Giuseppe |
| 2017/0227362 | A1* | 8/2017 | Pryszo .................... B63B 49/00 |
| 2017/0370724 | A1 | 12/2017 | Hovland et al. |

OTHER PUBLICATIONS

MaxSea; "MaxSea Commercial Fishing Software Pro Version 12.6"; retrieved May 15, 2020 from https://web.archive.org/web/20180112035746/http:/comen.maxsea.fr/MaxSea/Products/Features/AutomaticFollow-upContourlines/Default.aspx.

* cited by examiner

MARINE ELECTRONIC DEVICE FOR GENERATING A ROUTE BASED ON WATER DEPTH

FIELD OF THE INVENTION

Embodiments of the present invention relate generally to marine route generation, and more particularly, to systems and apparatuses for generating a route based on water depth.

BACKGROUND OF THE INVENTION

Navigational systems, such as marine navigational systems, may provide a display of a navigational chart or map. Nautical navigational charts including electronic or interactive nautical charts are typically used to provide a user with information about a body of water including (but not limited to) depth, routes, areas of interest, submerged objects, or the like. In some examples, nautical charts may also provide an indication of the location of a vessel associated with a chart display device. Further, some nautical charts may also display the location, course, speed, and/or other information for one or more other vessels on the body of water, such as provided by automatic identification system (AIS). Routes may be displayed in association with the navigational chart and may be followed by manual maneuvering of the vessel or by an autopilot system.

BRIEF SUMMARY OF THE INVENTION

In some embodiments of the present invention, a user interface of a marine electronic device (e.g., a multi-functional display or MFD) may be utilized to easily enter a route in relation to a chart. A user may enter a desired depth range, including a minimum and maximum depth, and an ending point on a navigational chart. The marine electronic device may generate a continuous route from a starting location to an ending location corresponding to the ending point entered by the user. The continuous route generated by the marine electronic device may satisfy both the minimum and maximum water depth throughout the route. In some example embodiments, the user may select the desired minimum and maximum depth values based on a desire to track depths at which fishing conditions may be suitable. For example, the user may know of, or the marine electronic device may provide information indicative of, depth ranges for particular fish types, thermocline layers, or the like. The user may utilize the continuous route to identify a path that positions a vessel on the body of water at the desired water depth. In some instances, the marine electronic device may be configured to provide control signals to an autopilot, which in turn controls a maneuvering system, such that the marine electronic device, via the autopilot and maneuvering system, causes the vessel to travel the continuous route automatically.

The marine electronic device may determine a starting location for the continuous route automatically based on a current position and/or based on a user input identifying a starting point on the chart. If the user identifies a starting point that is different from the current position of the vessel, the marine electronic device, may generate a continuous route that includes a route from the current position to the starting location, or may initiate the continuous route when the current position is within a predetermined radius of the starting location.

In addition to generating a route that follows user defined minimum and maximum depths, the marine electronic device may be further configured to maintain a predetermined distance from one or more identified conditions, such as a shoreline or a large change in water depth. For example, a user may input a distance from a shoreline, such as forty feet. The marine electronic device may generate a continuous route between the starting location and ending location that satisfies the minimum and maximum depth throughout the route and, also, maintains the forty foot distance from the shoreline to the maximum extent possible. Similarly, the user may input a distance of twenty feet from a water depth change of five feet. The marine electronic device may generate a route that avoids changes in water depth by five feet by maintaining at least twenty feet between the route and any identified depth changes of greater than five feet.

In some example embodiments, the depth values for generating the continuous route are retrieved from the navigational chart. The navigational chart may also include depth offset data, such as tide data, which may be applied to the chart depths to provide more accurate water depth data for generation of the route. Additionally, water depth offset data may be manually entered by the user based on lake level indicators and/or retrieved from a remote computing system, such a water level database maintained by a park service. Alternatively, the depth offset data may be applied to the minimum and maximum depth values for the route.

In an example embodiment, the water depth of a body of water may not match the navigational chart data, due to changes in the bottom contour of a body of water over time, such as due to storms, sediment movement, sunken objects, manmade intentional changes, or the like. In an example embodiment, the vessel may include a sonar transducer, such as a forward facing sonar transducer, linear downscan transducer, conical downscan transducer, etc., configured to measure a water depth in front of the vessel. The marine electronic device may compare the measured water depth based on the sonar data to the minimum and maximum depth values and/or the depth data from the navigational chart. The marine electronic device may be configured to cause an alert in an instance in which the measured depth fails to satisfy the minimum or maximum depth value and/or if the measured depth is inconsistent with the depth data from the navigational chart. Additionally, the marine electronic device may provide dynamic route adjustment based on the sonar data. For example, provide dynamic adjustment of the route to maintain the vessel in a water depth that satisfies the predetermined minimum and maximum depth values.

In an example embodiment, a marine electronic device is provided including a user interface, a processor, and a memory having computer program code stored thereon. The memory and the computer program code are configured to, with the processor, cause the marine electronic device to receive, via the user interface, a first user input defining a minimum water depth value for a route on a body of water, receive, via the user interface, a second user input defining a maximum water depth value for the route, cause a chart to be displayed on the user interface, receive, via the user interface, a third user input directed to the chart defining an ending point, and generate a continuous route from a starting location to an ending location corresponding to the ending point based on the maximum water depth value and the minimum water depth value.

In an example embodiment, the continuous route satisfies both the maximum water depth value and the minimum water depth value throughout the route. In some example embodiments, generating the continuous route from the starting location to the ending location includes determining two or more geographic areas that satisfy both the maximum water depth value and the minimum water depth value that are not connected between the starting location and ending location, determining a secondary maximum water depth value or a secondary minimum water depth value, determining one or more geographical areas that satisfy the secondary maximum water depth value or the secondary minimum water depth value, and determining a continuous route from the starting location to the ending location that traverses the two or more geographical locations that satisfy the maximum water depth value and the minimum water depth value and the one or more geographical areas that satisfy the secondary maximum water depth value or the secondary minimum water depth value.

In some example embodiments, the memory and the computer program code are further configured to, with the processor, cause the marine electronic device to determine geographic locations on the chart that correspond to the starting location and the ending location based on at least the third user input defining the ending point. In an example embodiment, the memory and the computer program code are further configured to, with the processor, cause the marine electronic device to receive, via the user interface, a fourth user input directed to the chart defining a starting point. Determining geographic locations on the chart that correspond to the starting location and the ending location is further based on the fourth user input defining the starting point such that the starting location corresponds to the starting point. In some example embodiments, the memory and the computer program code are further configured to, with the processor, cause the marine electronic device to receive current position data from a position sensor and correlate the current position data to the chart to define a starting point. Determining geographic locations on the chart that correspond to the starting location and the ending location is further based on the current position data defining the starting point such that the starting location corresponds to the starting point.

In some example embodiments, the memory and the computer program code are further configured to, with the processor, cause the marine electronic device to determine a continuous geographical area extending between the starting location and the ending location that includes a water depth that satisfies both the maximum water depth value and the minimum water depth value. In an example embodiment, generating the continuous route from the starting location to the ending location includes determining one or more geographic locations on the chart within the continuous geographical area that satisfies both the maximum water depth value and the minimum water depth value.

In an example embodiment, the memory and the computer program code are further configured to, with the processor, cause the marine electronic device to determine a predetermined condition between the starting location and the ending location and determine a predetermined distance threshold associated with the predetermined condition. Generating the continuous route from the starting location to the ending location is further based on satisfying the predetermined distance threshold. In some example embodiments, the predetermined condition includes at least one of a shore line, a depth change greater than a predetermined change threshold, an underwater obstacle, or an overwater obstacle. In an example embodiment, generating the continuous route is based on depth data associated with the chart, the chart includes depth offset data, and the memory and the computer program code are further configured to, with the processor, cause the marine electronic device to apply the depth offset data to the chart or the minimum depth value and maximum depth value. Generating the continuous route from the starting location to the ending location is further based on satisfying the minimum water depth value and the maximum water depth value with the depth offset data applied to the chart.

In some example embodiments, the memory and the computer program code are further configured to, with the processor, cause the marine electronic device to receive sonar data from a sonar transducer, wherein the sonar transducer is mounted to a vessel associated with the marine electronic device, determine a sonar measured water depth in front of the vessel based on the sonar return data, and adjust the continuous route based on the sonar measured water depth, such that the sonar measured water depth along the continuous route satisfies the minimum water depth value and the maximum water depth value.

Additional example embodiments of the present invention include methods, systems, and computer program products associated with various embodiments described herein, including, for example, the above described marine electronics device embodiments.

BRIEF DESCRIPTION OF THE DRAWINGS

Figure 1:
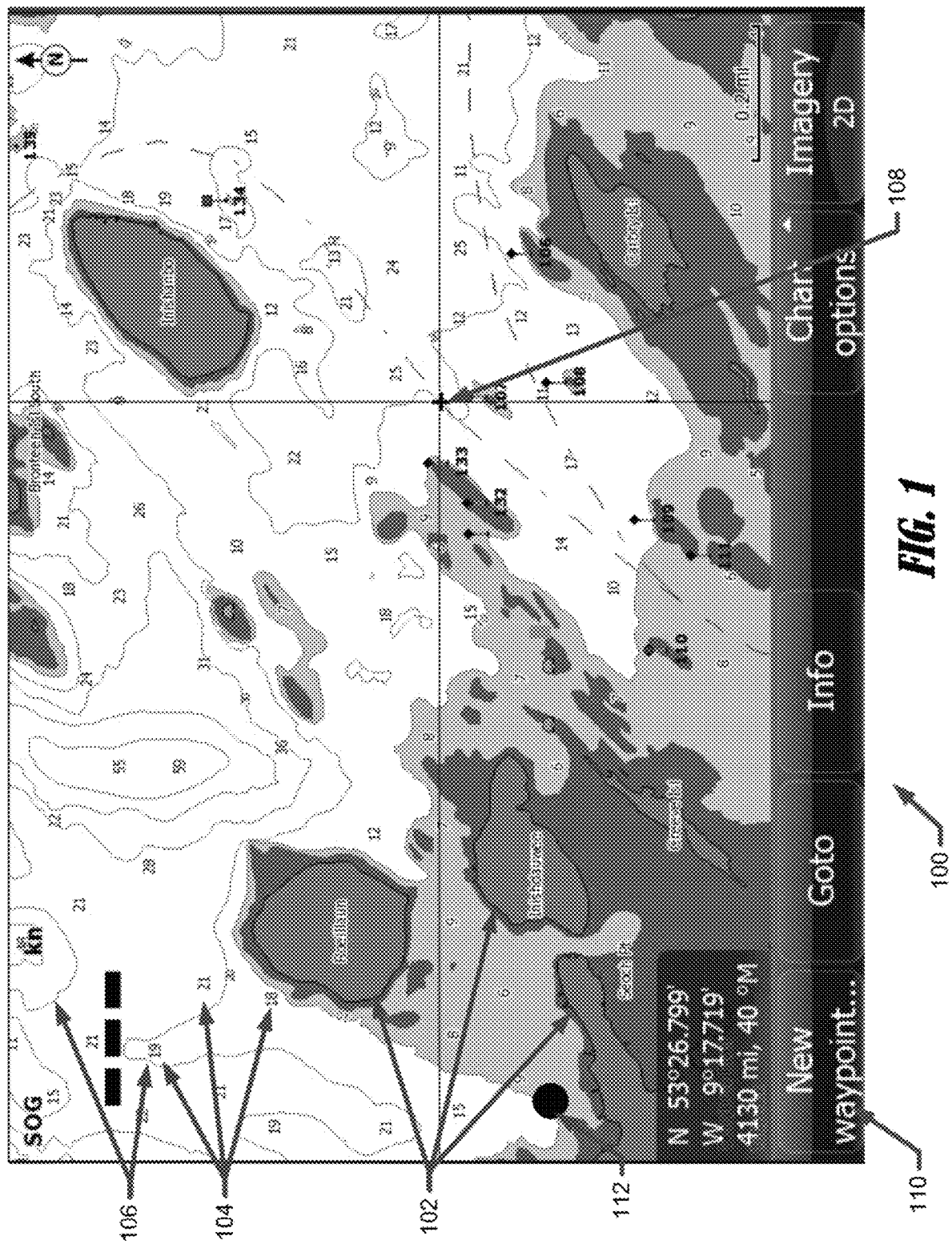
Figure 2:
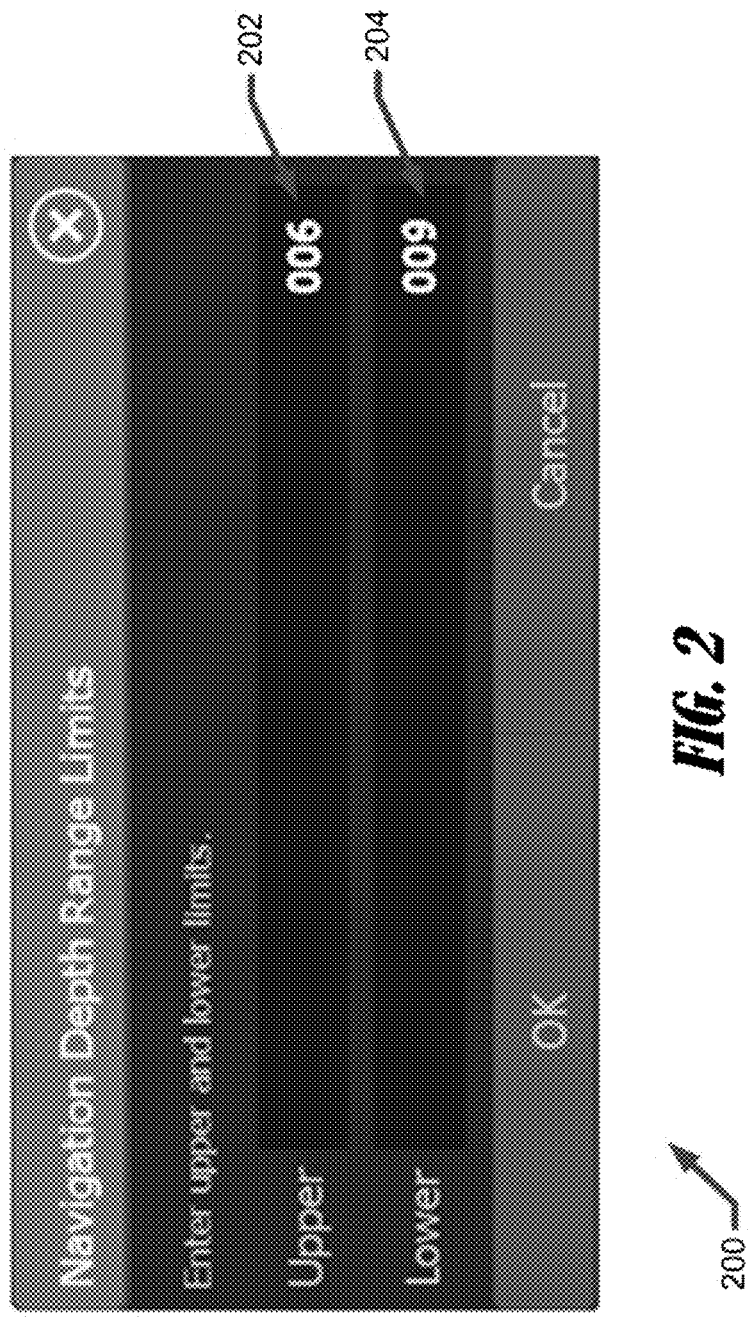
Figure 3:
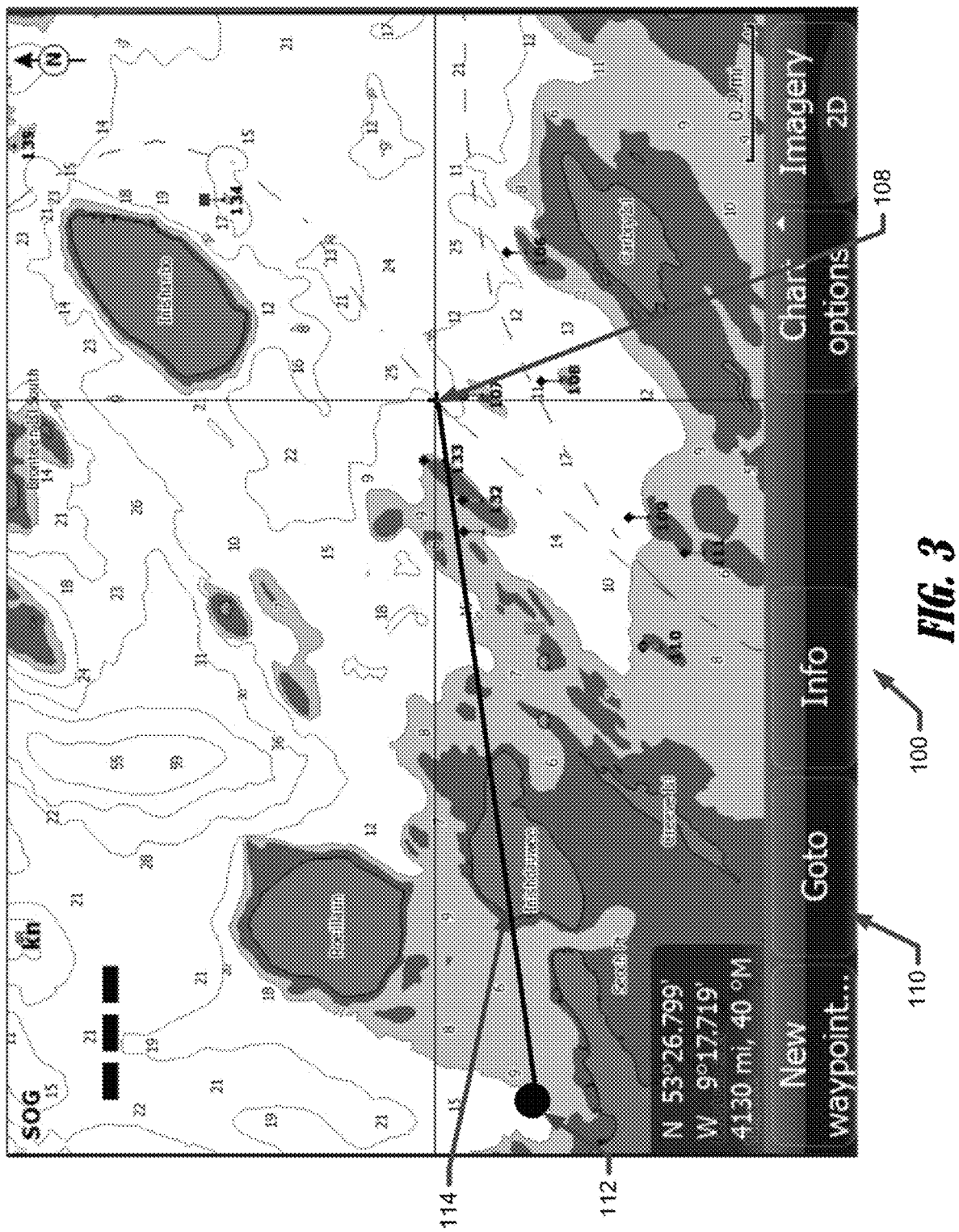
Figure 4:
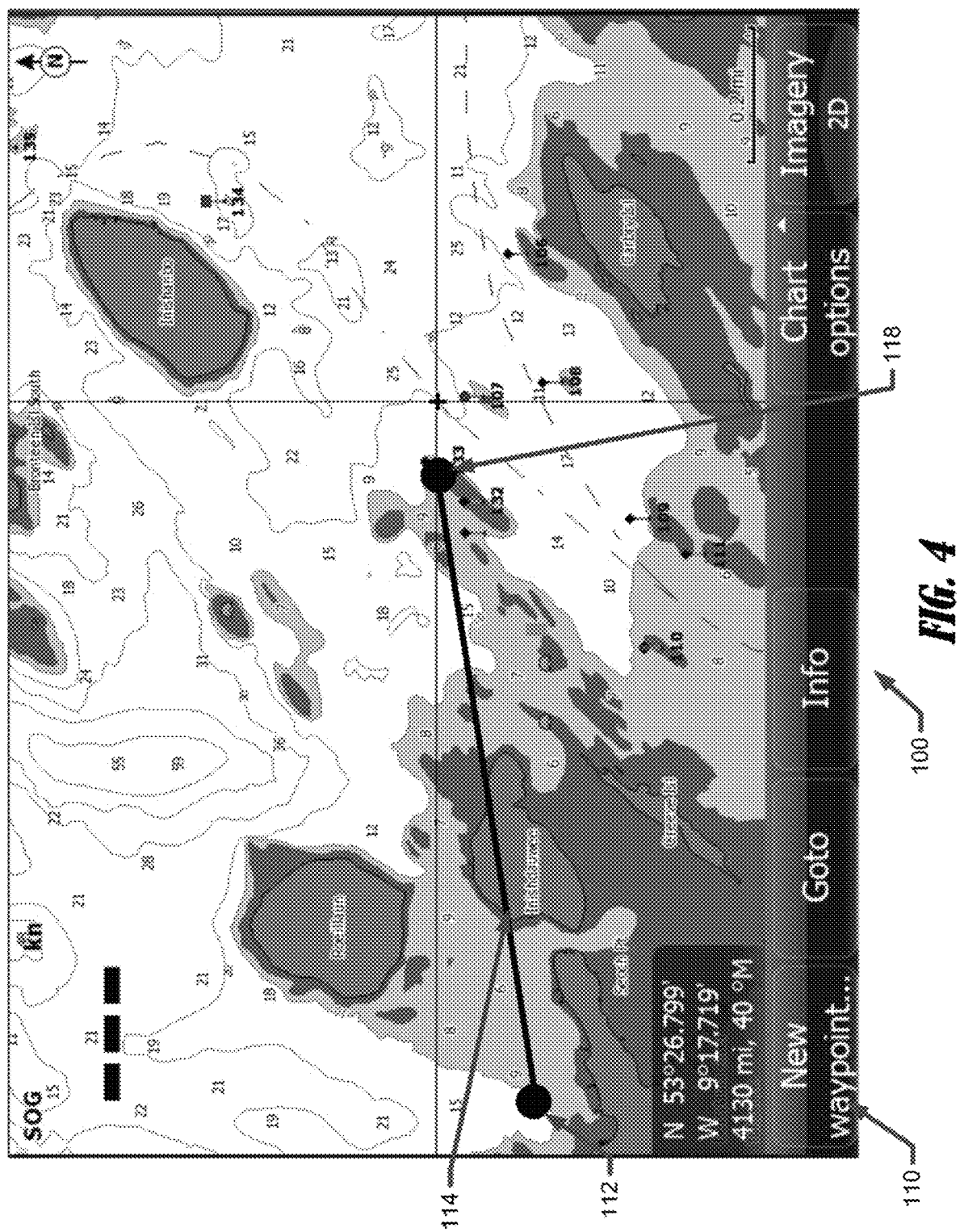
Figure 5:
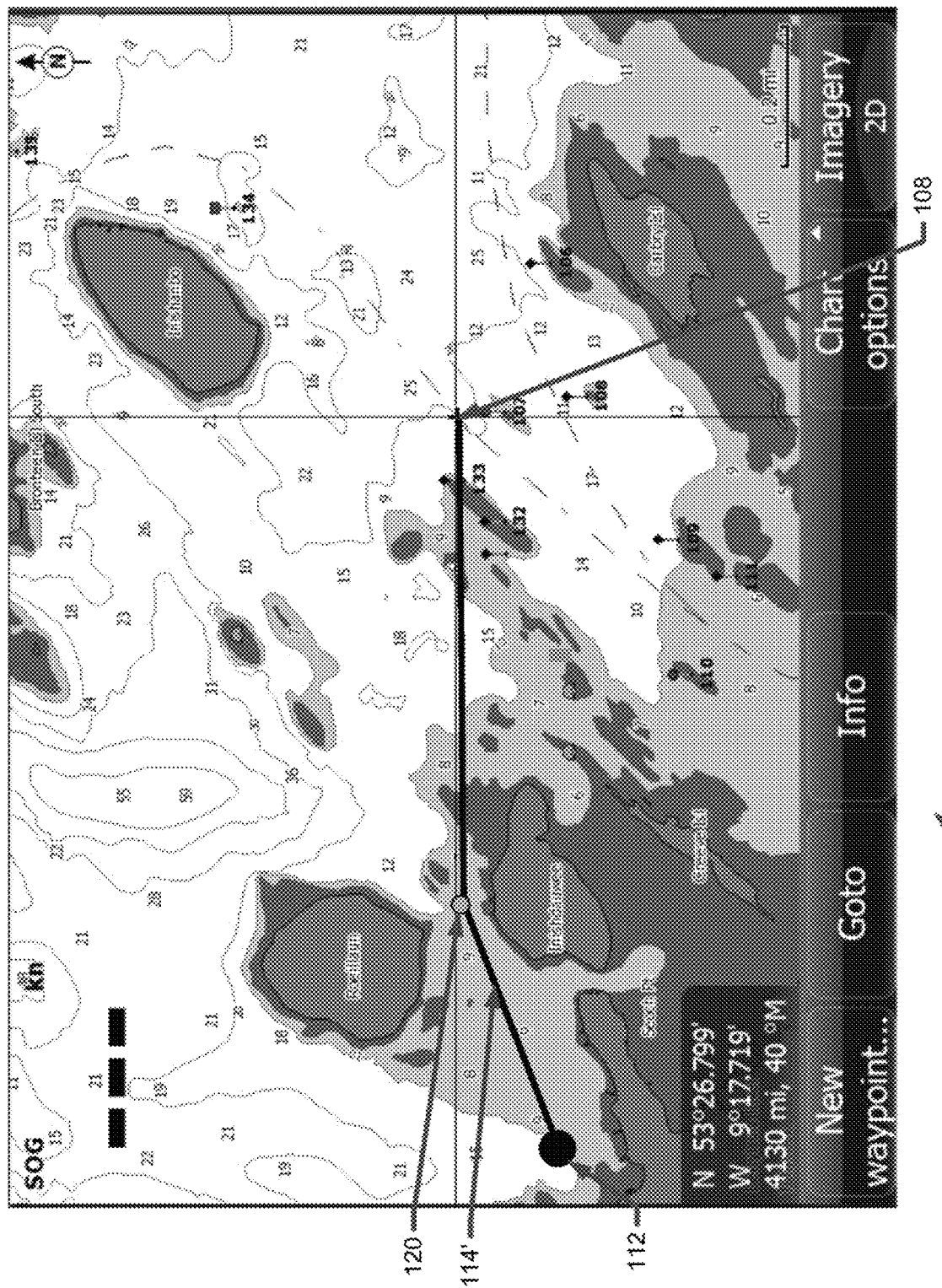
Figure 6:
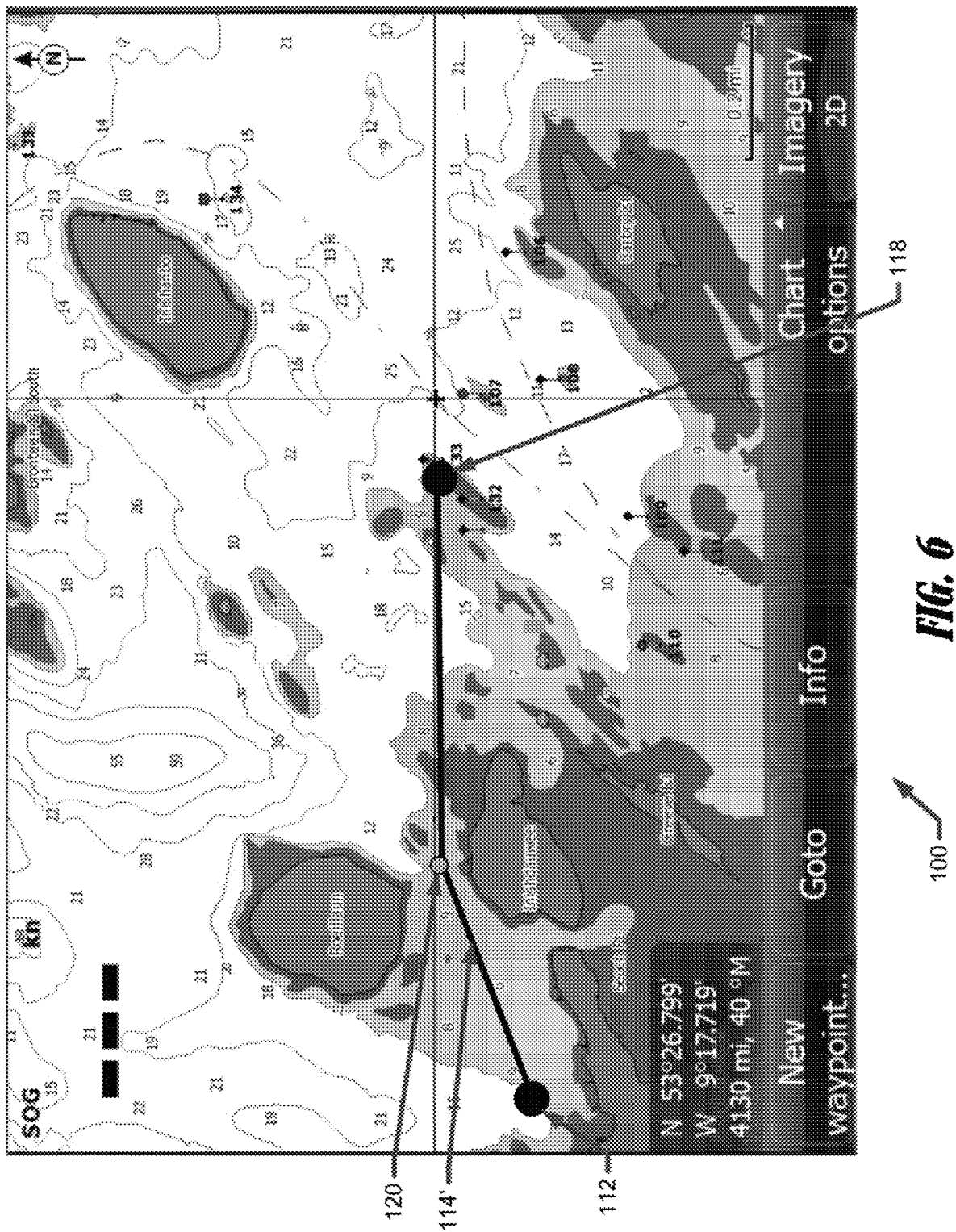
Figure 7:
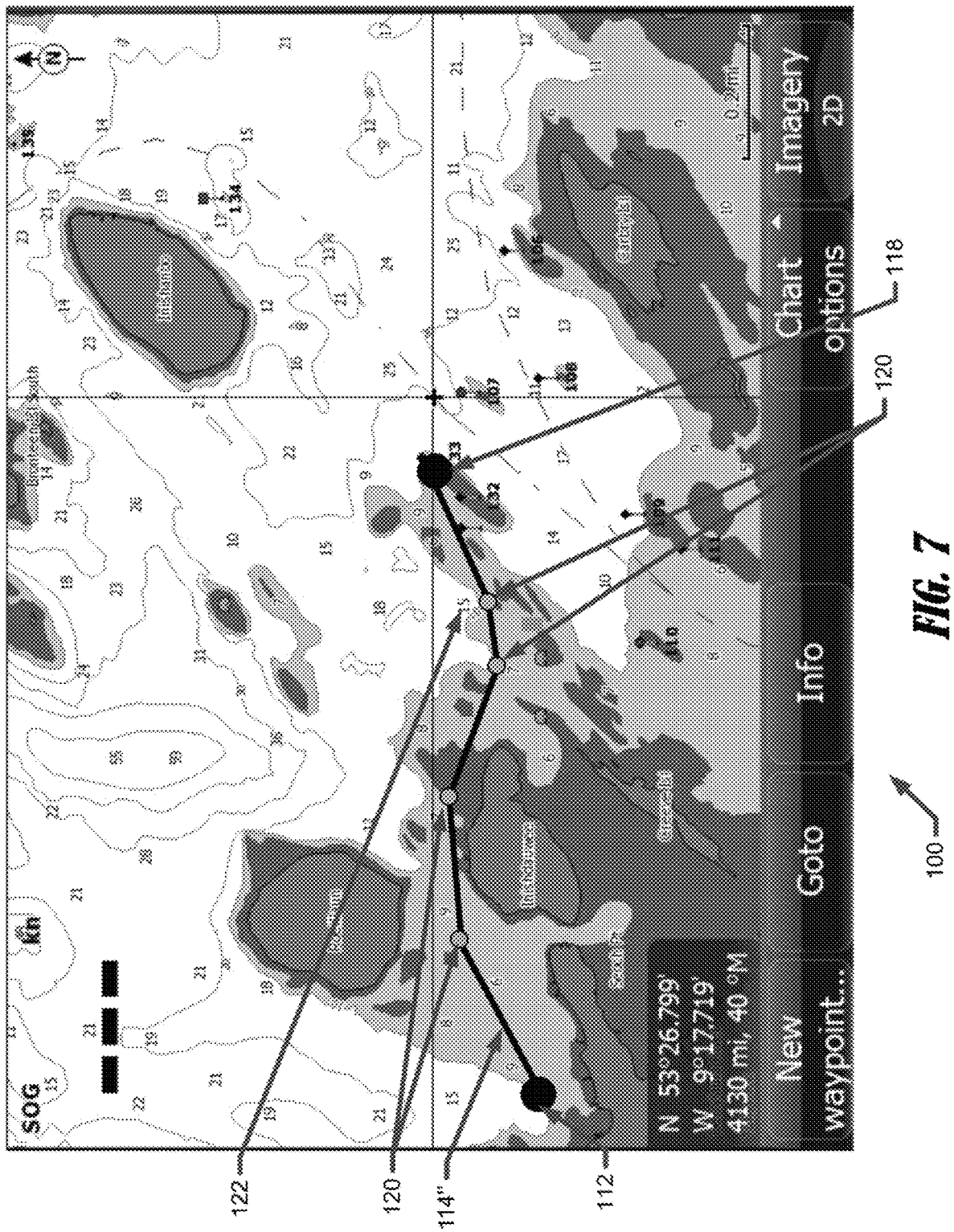
Figure 8:
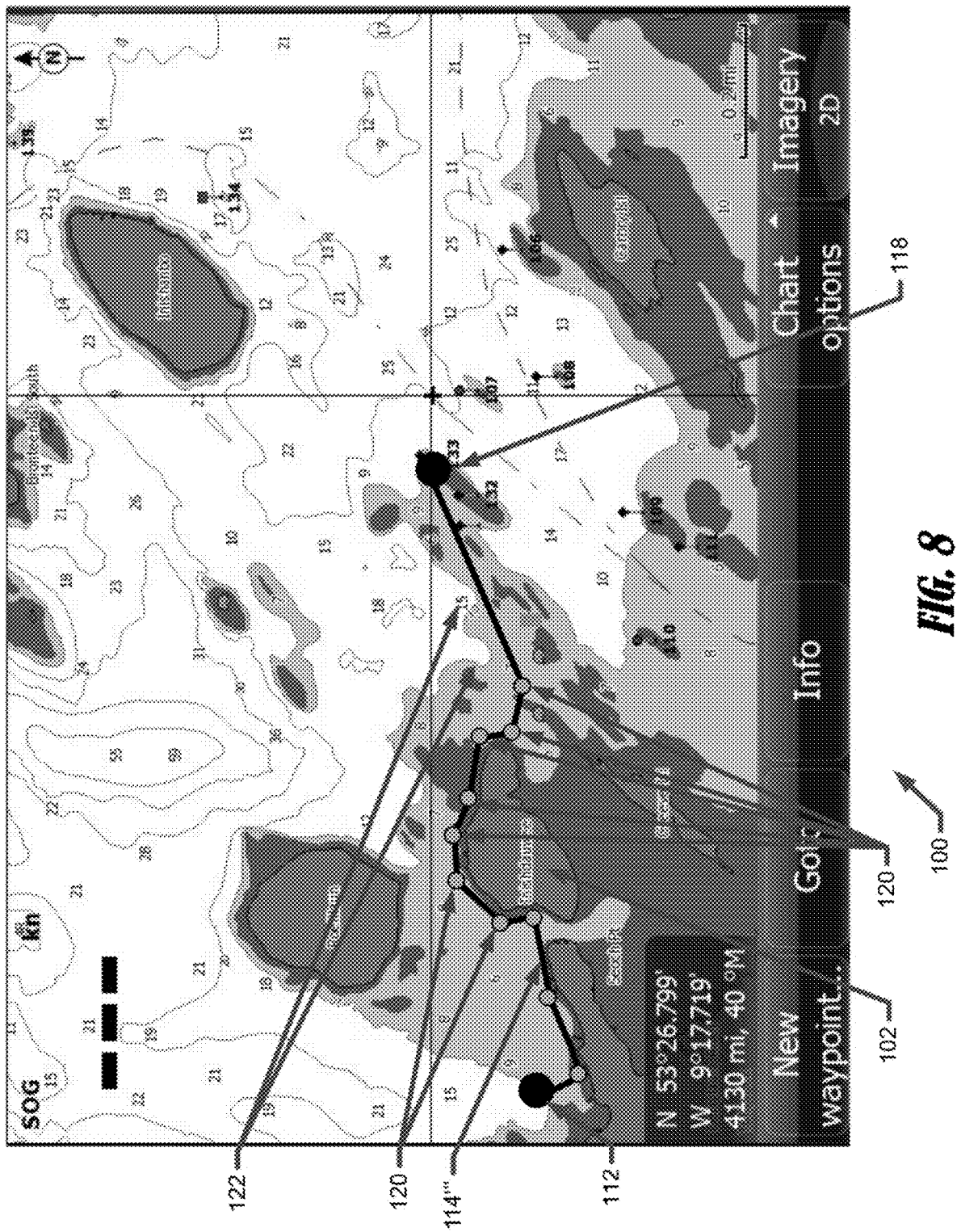
Figure 9:
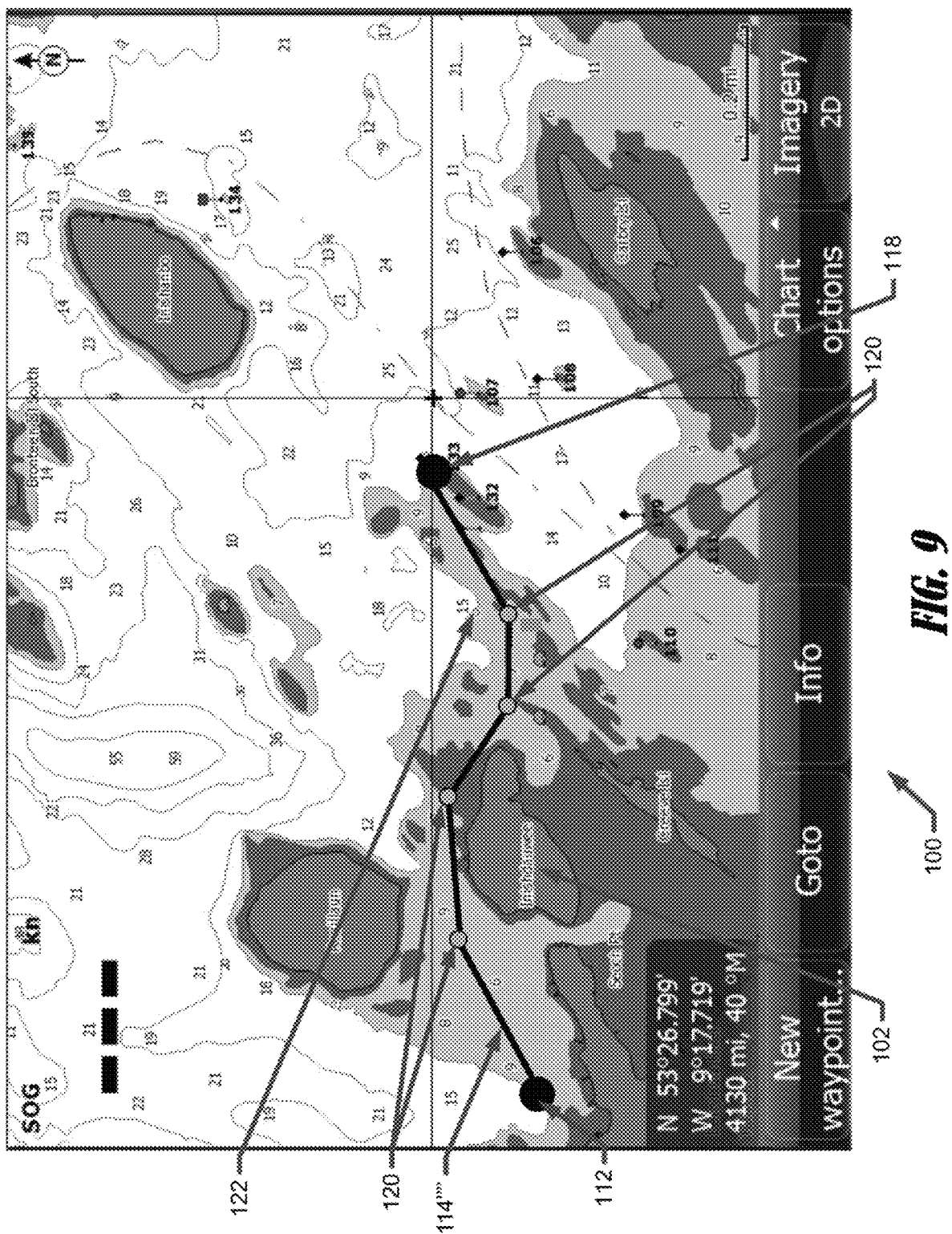
Figure 10:
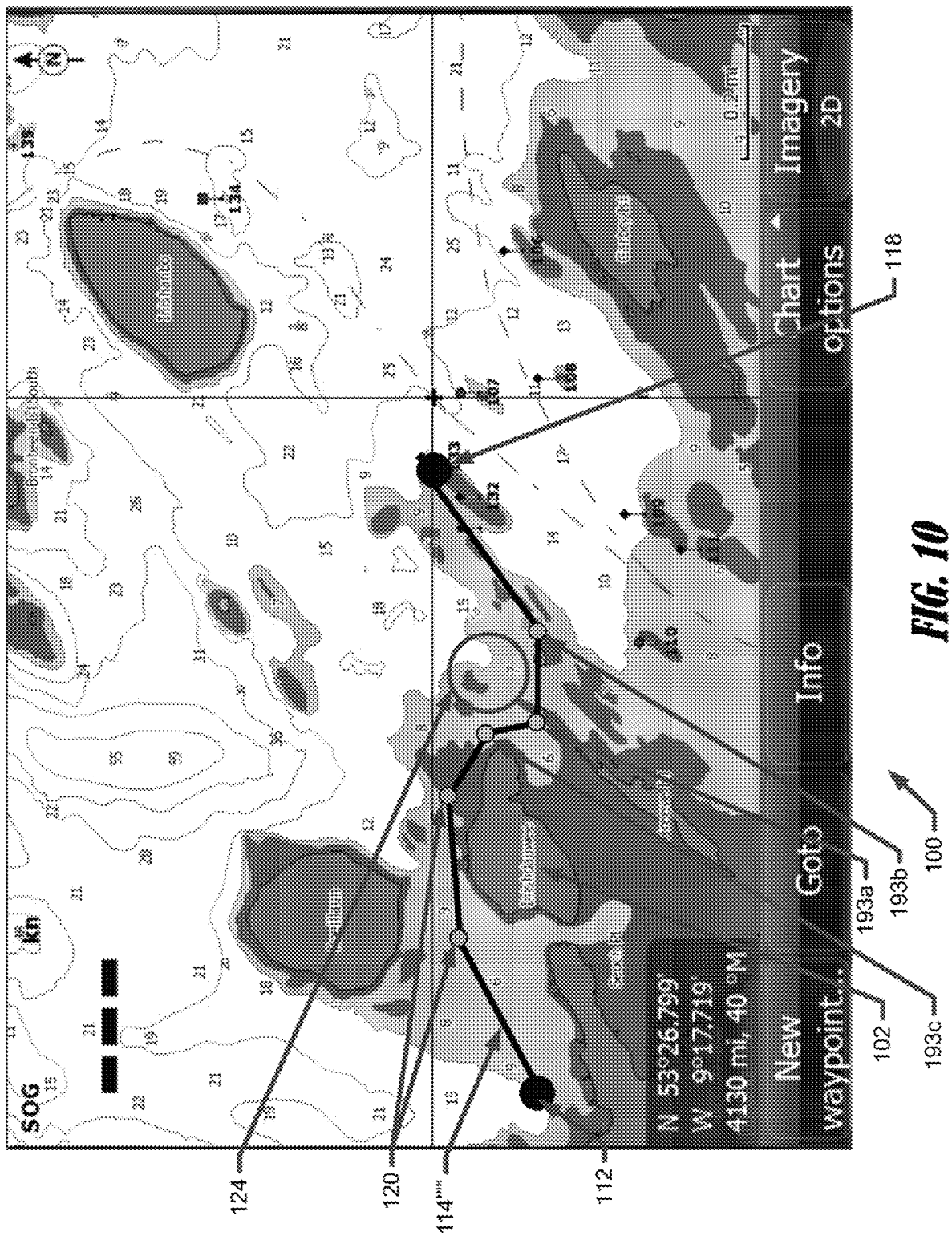
Figure 11:
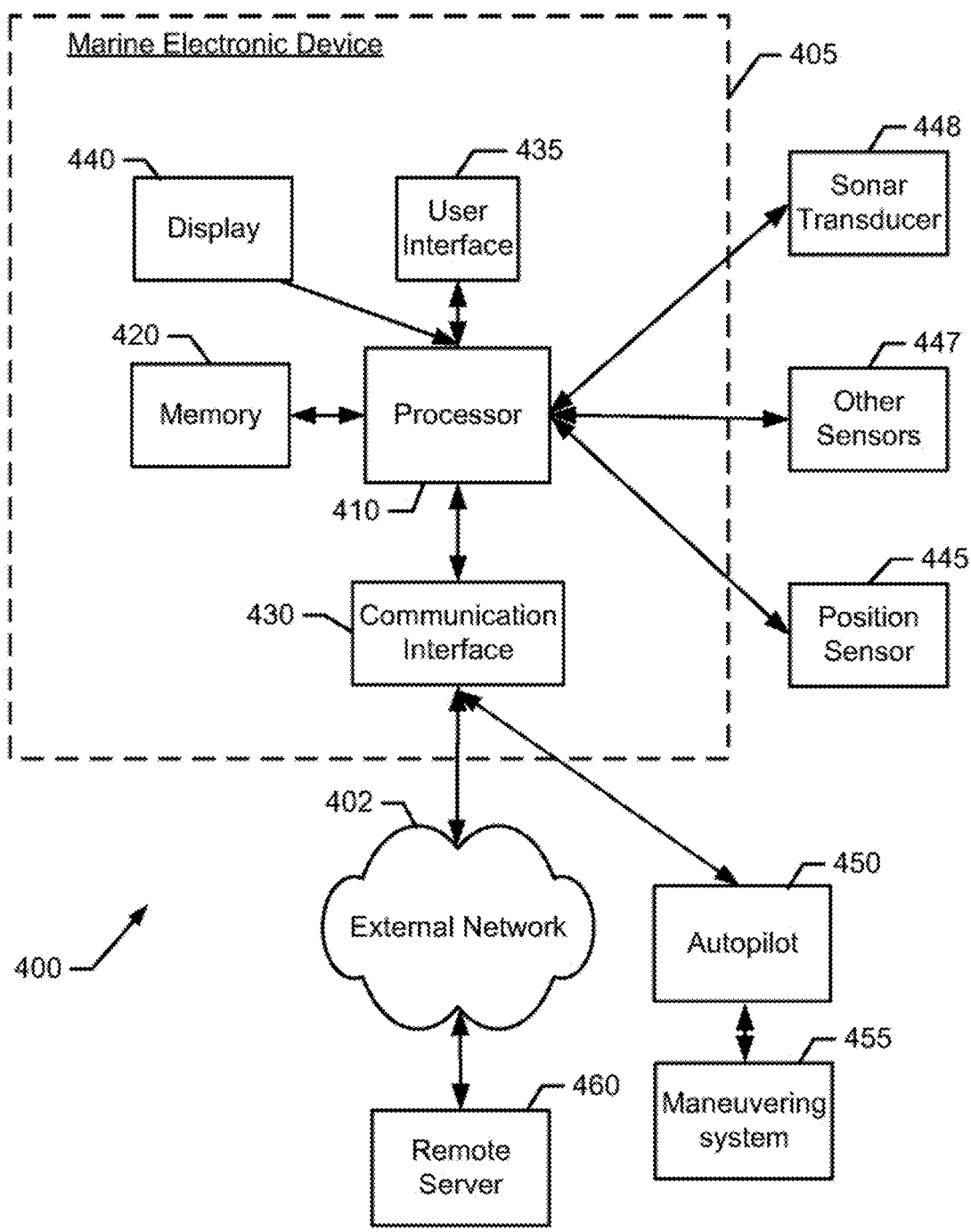
Figure 12:
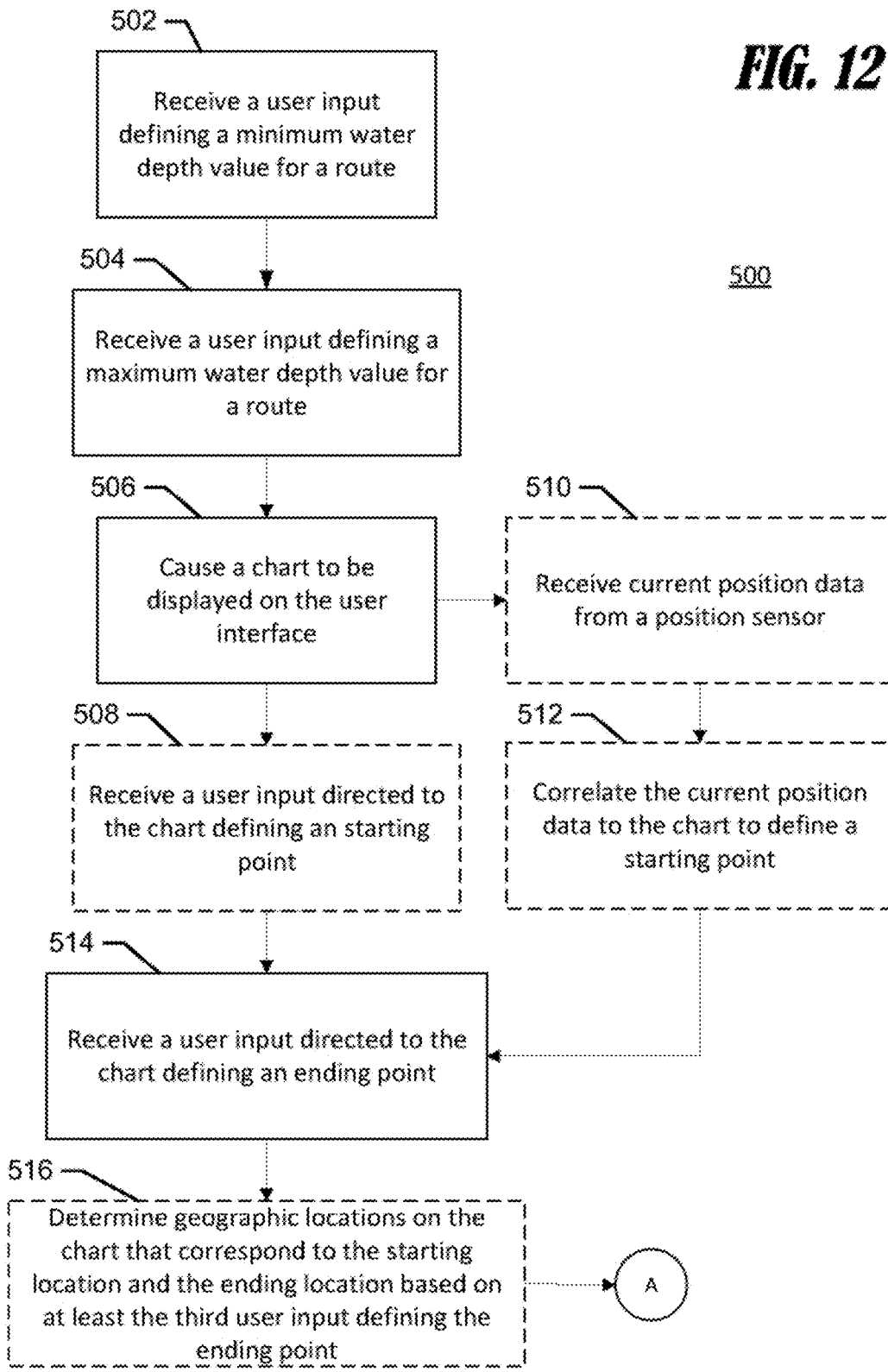
Figure 13:
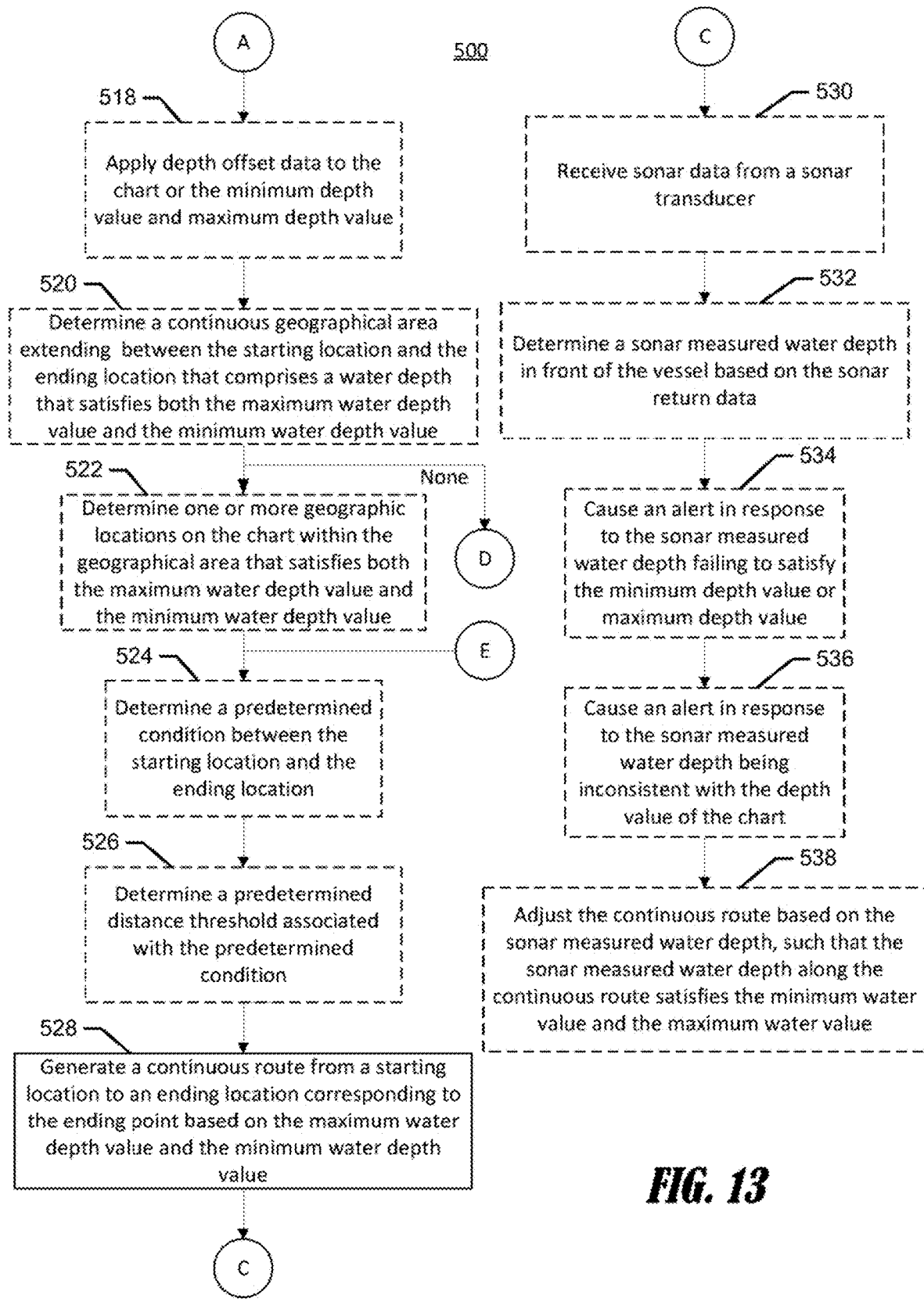
Figure 14:
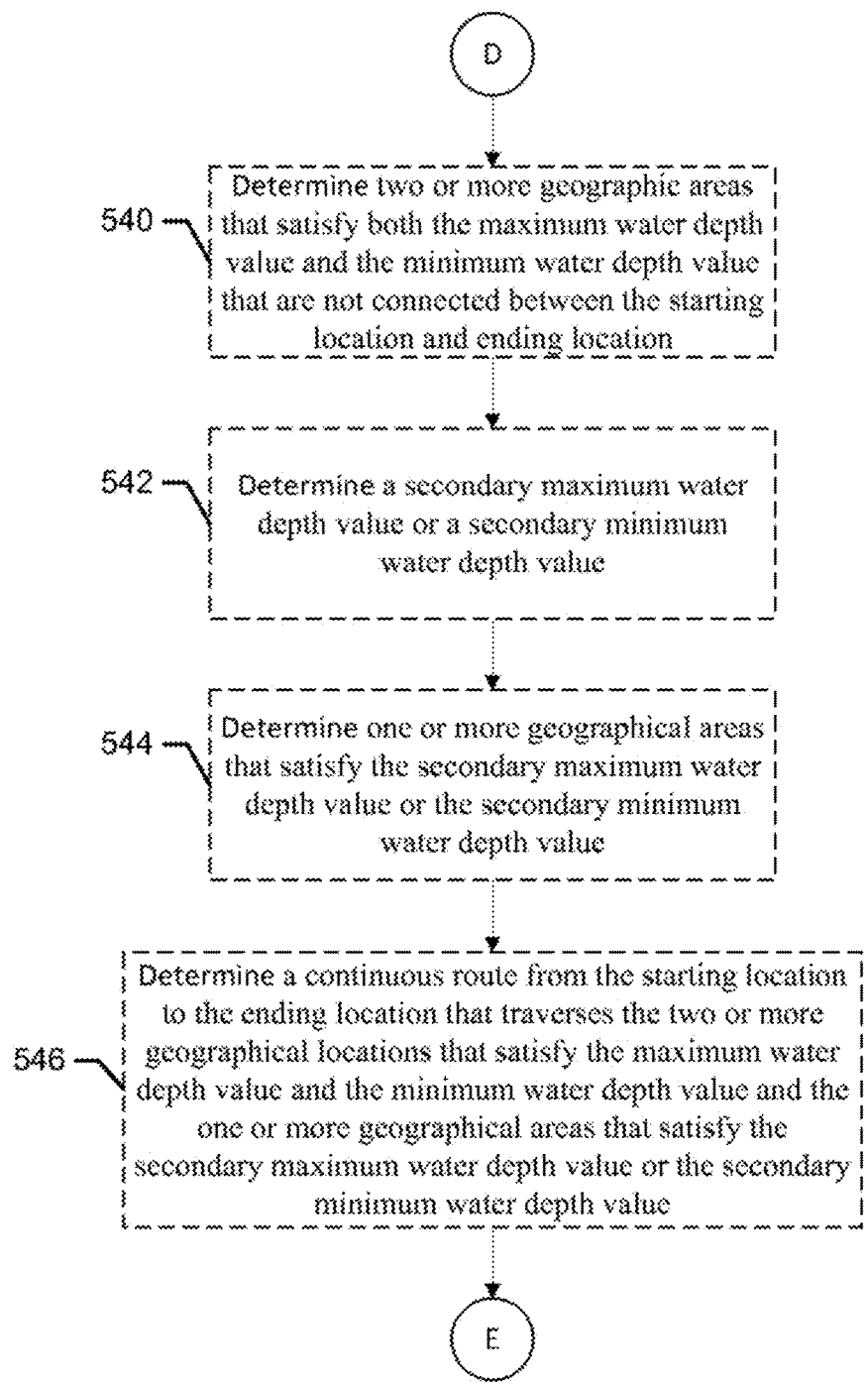

Having thus described the invention in general terms, reference will now be made to the accompanying drawings, which are not necessarily drawn to scale, and wherein:

FIG. 1 illustrates an example nautical chart, in accordance with some embodiments discussed herein;

FIG. 2 illustrates an example depth range user input interface, in accordance with some embodiments discussed herein;

FIG. 3 illustrates an example nautical chart with a direct line route initiated from a current position, in accordance with some embodiments discussed herein;

FIG. 4 illustrates an example nautical chart with direct line route initiated from a starting position, in accordance with some embodiments discussed herein;

FIG. 5 illustrates an example nautical chart with a route initiated from a current position and configured to avoid land, in accordance with some embodiments discussed herein;

FIG. 6 illustrates an example nautical chart with a route initiated from a starting position and configured to avoid land, in accordance with some embodiments discussed herein;

FIG. 7 illustrates an example nautical chart with a route configured to satisfy a minimum and maximum depth, in accordance with some example embodiments discussed herein;

FIG. 8 illustrates an example nautical chart with a route configured to satisfy a minimum and maximum depth and maintain a predetermined distance from shore, in accordance with some example embodiments discussed herein;

FIG. 9 illustrates an example nautical chart with a route configured to satisfy a minimum and maximum depth and maintain a predetermined distance from a significant depth change, in accordance with some embodiments discussed herein;

FIG. 10 illustrates an example nautical chart with a route configured to satisfy a minimum and maximum depth and avoid a selected area, in accordance with some embodiments discussed herein;

FIG. 11 illustrates a block diagram of an example marine electronic system, in accordance with some example embodiments discussed herein; and FIGS. 12-14 illustrate flowcharts of example methods of generating a route according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Example Navigational Charts

FIG. 1 illustrates an example nautical navigational chart 100, including land masses 102 and water depth values 104. The navigational chart 100 may be digitally displayed on a marine electronic device, such as on a user interface. The navigational chart 100 also includes a plurality of depth contour lines 106 marking changes in the depth values 104. The depth contour lines 106 may include outlining of the change in depth value or may include a change in color. For example, in some example navigational charts, deep water that is relatively free from hazards or that provides low risk of running aground may be a light blue or white color with outlines at significant changes of depth. In contrast, at shallower depths, the contour lines 106 may include color changes indicative of the relative risk of running aground, such as increasingly brighter colors for shallower depth values.

The example navigational chart 100 depicted in FIG. 1 includes an indication of a current position 108 of a vessel. The current position 108 may be determined by the marine electronic device based on position data received from a position sensor, such as a global position system (GPS) sensor, or other suitable position sensor. The marine electronic device may correlate the position data to the navigational chart 100 and plot the current position 108.

In some example embodiments, the user may use a user interface, such as a mouse, joystick, touch pad, buttons, touch screen, or the like to create a new route. In some example embodiment, the user may pilot the vessel based on the route and the current position. Additionally or alternatively, the vessel may include an autopilot configured to send control signals to a maneuvering system, such as an outboard motor, trolling motor, control planes, rudder, or the like. The marine electronic device may send route data to the autopilot identifying the route, waypoint along the route, headings, distances, or the like. The autopilot may generate control signals based on the route data to control the maneuvering system to automatically pilot the vessel along the route.

In some example embodiments, the user may interact with one or more route icons 110, such as a "new waypoint", "go to," "home," or the like and follow prompts, such as "identify a starting point," "identify an ending point," "identify a minimum and maximum depth," "identify other route conditions," or the like to identify one or more route parameters. The user may define a user input directed toward the navigation chart identifying an ending point 112 of a desired route. Additionally, in reference to FIG. 2, the user may enter a minimum depth value 202 and a maximum depth value 204 in a depth range limit prompt 200 or interface. In the depicted embodiment, the user has selected a minimum depth of six feet and a maximum depth of nine feet.

FIG. 3 illustrates the navigational chart 100 including a theoretical route 114 extending directly between a starting location defined by the current position 108 and an ending location corresponding to the identified ending point 112. FIG. 4 illustrates the navigational chart 100 including a theoretical route 114 extending between the starting location defined by a user identified starting point 118 and the ending location corresponding to the identified ending point 112. The marine electronic device may determine geographic locations on the navigational chart 100 corresponding to the starting point 118, ending point 112, and/or the current position. The routes 114, depicted in FIGS. 3 and 4 are straight line paths, e.g. direct line routes, between the starting location and ending locations and do not take the land masses 102 into consideration. In this regard, the marine electronic device may determine the direct line route or path to define the shortest route between the starting location and the ending location.

In some example embodiments, the navigational chart 100 may include depth data corresponding to the indicated depth values 104. In some example embodiments, the depth values 104 as indicated on the navigational chart 100 may be average depth values or lowest expected depth values. The navigational chart 100 may also include depth offset data, such as tidal data based on date and time. The marine electronic device may determine applicable depth offset data for the depth values 104 based on date and time, and apply the depth offset data to the depth values 104 of the navigational chart 100. Additionally or alternatively, the marine electronic device may adjust the minimum depth value and maximum depth value by applying the depth offset. In addition to depth offset data included in the navigational chart, the depth values 104, or the minimum depth value and maximum depth value, may be updated or supplemented by depth offset data from a remote server. Depth offset data due to updated depth values may be stored by a navigational service or a park service based on current lake levels or the like. The marine electronic device may be configured to retrieve depth offset values based on the updated depth values 104 or current lake levels from the remote server and apply the depth offset data to the depth values 104 of the navigational chart 100 or the minimum depth value and maximum depth value. In some example embodiments, the user may enter a user input identifying a depth offset based on lake level indicators or other suitable body of water depth indicator, and the marine electronic device may apply the depth offset data to the depth values 104 of the navigational chart 100 or the minimum depth value and maximum depth value.

Some navigational devices, e.g. marine electronic devices, may be configured to compare the minimum water depth value to the depth data to determine a route that satisfies the minimum depth value. FIGS. 5 and 6 illustrate the navigational chart 100 including routes 114' generated by the marine electronic device to avoid land and including a minimum depth value. The marine electronic device may be configured to generate a route that minimizes the number of waypoints 120, or changes in heading. In the depicted example, the route 114' includes one waypoint 120 in addition of the starting point 118 (FIG. 6) or current position 108 (FIG. 5), enabling the route to avoid both land and satisfy a predetermined minimum depth value of six feet. However, the routes 114' are generated without regard for the maximum depth value of nine feet. As such, the route 114' traverses a portion of the body of water that is identified as having a water depth of approximately fifteen feet, which exceeds the nine foot maximum depth value and may not be conducive for fishing or for catching a desired fish type.

In accordance with aspects of the present invention, the marine electronic device may be configured to determine a route that satisfies both the minimum depth value and the maximum depth value throughout the route. FIGS. 7-10 illustrate the navigational chart 100 including routes 114", 114''', 114'''', 114''''' that satisfies both the minimum depth value of six feet and the maximum depth value of nine feet. The depicted routes extend from the starting point 118, which satisfies the minimum and maximum depth value, to the ending point 112. Additionally, in some example embodiments, the route 114 may include an additional portion extending between the current position 108 and the starting location corresponding to the starting point 118 to enable autopilot or navigation from the current position 108 to the route. Alternatively, the user may pilot the vessel to the starting location corresponding to the starting point 118. The marine electronic device may be configured to initiate autopilot of the route in response to the current position 108 satisfying a predetermined proximity threshold of the starting location, such as 5 feet, 10 feet, or other suitable distance.

FIG. 7 illustrates the navigational chart 100 including a route 114" that satisfies both the minimum depth value of six feet and the maximum depth value of nine feet. The marine electronic device may determine a continuous geographical area extending between the starting location and the ending location that satisfies both the minimum depth value and the maximum depth value. The marine electronic device may compare the depth values 104 of the navigational chart 100 to the minimum depth value and maximum depth value to determine areas of the body of water that satisfy both the minimum depth value and the maximum depth value. In the depicted navigational chart 100, the areas indicated as light grey and dark grey satisfy both the minimum depth value and the maximum depth value. The marine electronic device may determine a continuous geographical area extending between the starting location and the ending location that satisfies both the minimum depth value and the maximum depth value.

In some embodiments, the marine electronic device may then determine a continuous route 114 between the starting location corresponding to the starting point and the ending location corresponding to the ending point. The marine electronic device may determine one or more geographic locations on the navigational chart 100 within the geographical area that satisfies both the minimum depth value and the maximum depth value. The marine electronic device may determine the continuous route along one or more of the geographic locations based on a shortest path, lowest number of waypoints, or the like between the starting location and ending location that also satisfies both the minimum depth value and the maximum depth value. In the example depicted in FIG. 7, the route 114" propagates from the starting point 118 in a west-southwest direction to avoid the water depth greater than the nine feet maximum depth value, e.g. deep water 122. The route 114" then extends generally westward toward the Inishdauwee Island at a first waypoint 120. The route 114" then extends west-northwest from a second waypoint 120 to avoid Inishdauwee Island and satisfy the minimum depth value of six feet. At a third waypoint 120, the route 114" turns back to a west extension before turning southwest to the ending point 112, after passing Inishdauwee Island and surrounding shallow waters.

In some examples embodiments, there may be no path that satisfies both the minimum and maximum depth values. For example, a shallow area or deep water feature may reside between the starting point 118 and ending point 112—splitting geographical areas that satisfy the both the minimum depth value and the maximum depth value. One or more secondary depth values may be utilized to traverse these areas that are not depth compliant. The secondary depth values may be entered by the user, in a manner similar to the minimum depth value and the maximum depth value discussed above in regard to FIG. 2, may be default values based on the type of watercraft, keel depth, or the like, or a combination of user input and default values. In the present example, the secondary depth values may include a secondary minimum depth value of four feet and a secondary maximum depth value of twenty-five feet. The marine electronic device may determine one or more geographical areas between the starting location and the ending location that satisfy both the minimum depth value and the maximum depth value. The marine electronic device may then determine one or more geographical areas between the starting location and the ending location that satisfies both the secondary minimum depth value and the secondary maximum depth value. The marine electronic device may then proceed to determining a continuous route between the starting location and the ending location that satisfies both the minimum depth value and the maximum depth value to the maximum extent possible and the secondary minimum depth value and the secondary maximum depth value in geographical areas that do not satisfy the minimum depth value and the maximum depth value.

Along similar lines, in some embodiments, the route may be formed to attempt to satisfy the minimum or maximum depth values, but may not actually maintain strict adherence to the depth range when it is not possible (such as in the example described above). In some such example embodiments, additional rules can be followed when it is not possible to maintain the desired depth range. For example, the route may be formed with a direct line in such non-compliant areas, secondary depth ranges may be considered, hazards may be avoided, etc.

In some example embodiments, the user may identify one or more additional parameters for the route, such as maintaining a predetermined distance or setting a minimum or maximum distance from one or more conditions of the body of water. Some example conditions may include without limitation, a shoreline; a change in water depth of a predetermined amount, such as a five foot change, twenty foot change, or the like; an underwater obstacle, such as a ship wreck; an overwater obstacle, such as a bridge; or other suitable condition.

In an example embodiment, a user may input a distance from a shore line, such as ten feet, forty feet, or the like. The marine electronic device may generate a continuous route between the starting location and ending location that satisfies the minimum depth value and maximum depth value throughout the route and, also, maintains the predetermined distance from the shoreline to the maximum extent possible. FIG. 8 illustrates the navigational chart 100 including a route 114''' that was generated to maintain a predetermined distance from shorelines along the route. The route extends west-southwest to avoid water that exceeds the maximum depth value of nine feet and then follows the contour of Inishdauwee Island to the western shore of the island. The route 114''' then extends to follow the contour of Seoch Pt, before extending north-northwest to the ending point.

In another example, the user may input a minimum distance of twenty feet from a water depth change rate of five feet depth per one foot distance, twenty feet depth per one foot distance, or the like. The marine electronic device may generate a route that avoids changes in water depth of the predetermined depth change rate by maintaining, for example, at least twenty feet between the route and any identified depth changes rates of greater than five feet per one foot distance. FIG. 9 illustrates a route 114'''' that is substantially similar to the route 114'' depicted in FIG. 7, however, the first and second waypoint 120 have been shifted south. The southward shift of the first and second waypoints 120 enable the route 114'''' to maintain at least the predetermined twenty foot minimum distance from the deeper water 122 and satisfy the minimum depth value and maximum depth value.

In yet a further example embodiment, the user may select one or more areas on the body of water to avoid, such as a stump field, a military practice area, shipping lane, or the like. The user may select the area by identifying a portion of the navigational chart 100, such as by touch input, cursor section, or the like. Additionally or alternatively, a user may select an area by defining a depth range to avoid. For example, if the minimum depth value was set at thirty feet and the maximum depth value was set at one hundred feet, a user may select an avoidance depth range of fifty feet to seventy feet. The marine electronic device may then identify portions of the navigation chart that include a depth within the avoidance depth range. A selected area 124 may be identified on the navigational chart 100, as depicted in FIG. 10. The marine electronic device may generate a continuous route 114''''' that satisfies the minimum and maximum depth and avoids a selected area 124, such as by maintaining a predetermined distance from the selected area 124. The route 114''''' is similar to route 114'''' of FIG. 9, however waypoints 193a, 193b have been shifted south to avoid the selected area 124 and a new waypoint 193c has been added to navigate around the eastern peninsula of Inishdauwee Island.

In an example embodiment, the actual water depth of body of water may not match the depth values 104 of the navigational chart 100, due to changes in the bottom contour of a body of water over time, such as due to storms, sediment movement, sunken objects, manmade intentional changes, or the like. In an example embodiment, the vessel associated with may include, sonar transducer, such as a forward facing sonar transducer, linear downscan transducer, conical downscan transducer, etc., configured to measure a water depth in front of the vessel. The marine electronic device may compare the measured water depth based on the sonar data to the minimum depth value and maximum depth values and/or the depth data from the navigational chart 100. The marine electronic device may be configured to cause an alert in an instance in which the measured depth fails to satisfy the minimum depth value or maximum depth value and/or if the measured depth is inconsistent with the depth data from the navigational chart 100. The alert may be an audio or visual indicator configured to draw the user's attention to the marine electronic device user interface.

In some example embodiments, the marine electronic device may provide dynamic route adjustment based on the sonar data. For example, the marine electronic device may provide dynamic adjustment of the route to maintain the vessel in a water depth that satisfies the predetermined minimum and maximum depth values. The marine electronic device may compare the measured water depth based on the sonar data to the minimum depth value and the maximum depth value. In response to the measured depth value associated with the route failing to satisfy the minimum depth value or the maximum depth value, the marine electronic device may cause the route to shift toward a measured depth value that satisfies the minimum depth value and the maximum depth value. If the sonar data does not include a measured depth value that satisfies the minimum depth value and the maximum depth value, the marine electronic device may cause the autopilot to stop the vessel.

In some example embodiments, the navigational chart 100 may also include a clearance value, e.g. a height to an object, such as a bridge, over the water. The marine electronic device may receive vessel height value, such as entered by a user or a default value based on the vessel type, marine electronic device, manufacture selection, or the like. The marine electronic device may then determine the continuous route in the manner discussed above, which also satisfies the vessel height value (or accounts for the vessel height value within the depth range). The marine electronic device may compare the vessel height value to one or more clearance values along one or more potential continuous routes, or geographical areas that satisfy the minimum depth value and the maximum depth value. The marine electronic device may select a continuous route that satisfies the minimum depth value, the maximum depth value, and the vessel height value. Similar to the depth values discussed above, the depth offset may be applied to the clearance value or the vessel height value.

The generation of the continuous route may enable a user to define routes to follow a particular depth range, such as a depth range for which fishing conditions may be ideal. Additionally, the marine electronic device may enable generation of routes to follow a condition, such as a shoreline, and/or avoid other conditions, such as obstacles, while maintaining the vessel in the desired depth range.

Example Architecture

FIG. 11 shows a block diagram of an example computing device, such as an example marine electronic device 405. The marine electronic device 405 (MFD) may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine data system 400.

The marine electronic device 405 may include a processor 410, a memory 420, a user interface 435, a display 440, and a communication interface 430. Additionally, the marine electronic device 405 may include or otherwise be in communication with one or more sensors (e.g. position sensor 445, other sensors 447, etc.) and/or one or more sonar transducers 448.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data, generate sonar image data, and generate one or more sonar images based on the sonar image data. Additionally or alternatively, the processor 410 may be configured to generate and send route data including instructions to the autopilot 450 to operate the maneuvering system 455 to cause the vehicle to travel along the route.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit or receive data, such as sonar signals, sonar returns, sonar image data or the like to or from a sonar transducer 448. In some embodiments, the marine electronic device may also be configured to communicate with a propulsion system of the vessel 100. The marine electronic device may receive data indicative of operation of the propulsion system, such as engine or trolling motor running, running speed, or the like.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 2 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The sonar transducer 448, such as transducer assemblies, may be housed in a trolling motor housing, attached to a vessel 100, e.g. watercraft, or, in some cases, be castable or otherwise remote. The sonar transducer 448 may be configured to gather sonar return signals, e.g. sonar returns, from the underwater environment relative to the vessel. Accordingly, the processor 410 may be configured to receive the sonar return data from the sonar transducer 448, process the sonar return data to generate an image including a sonar image based on the gathered sonar return data. In some embodiments, the marine electronic device 405 may be used to determine depth and bottom contours, detect fish, locate wreckage, etc. In this regard, sonar beams or pulses from a sonar transducer 448 can be transmitted into the underwater environment. The sonar signals reflect off objects in the underwater environment (e.g. fish, structure, sea floor bottom, etc.) and return to the transducer assembly, which converts the sonar returns into sonar return data that can be used to produce a sonar image of the underwater environment.

The autopilot 450 may include processing circuitry, such as a processor and a memory, configured to operate the maneuvering system 455. The autopilot 450 may be configured to operate the maneuvering system automatically, e.g. without user interaction, causing a vehicle, such as a watercraft to travel along the route 114. The autopilot 450 may generate instructions based on a vehicle position, the route or the like to operate the maneuvering system 455.

The maneuvering system 455 may include one or more propulsion motors, or engines, including but not limited to, outboard motors, inboard motors, trolling motors, main engines, emergency propulsion motors, or the like. Additionally, the maneuvering system 455 may include one or more control surfaces, such as rudders, planes, or the like configured to steer the vehicle.

Example Flowchart(s) and Operations

Embodiments of the present invention provide methods, apparatus and computer program products for generating routes. Various examples of the operations performed in accordance with embodiments of the present invention will now be provided with reference to FIGS. 12-14.

FIGS. 12-14 illustrate a flowchart according to example methods for generating a route according to an example embodiment. The operations illustrated in and described with respect to FIGS. 12-14 may, for example, be performed by, with the assistance of, and/or under the control of one or more of the processor 410, memory 420, communication interface 430, user interface 435, position sensor 445, other sensor 447, display 440, and/or sonar transducers 448.

The method 500 may include receiving a user input defining a minimum water depth value for a route at operation 502, receiving a user input defining a maximum water depth value for a route at operation 504, causing a chart to be displayed on the user interface at operation 506, receiving a user input directed to the chart defining an ending point at operation 514, and generating a continuous route from a starting location to an ending location corresponding to the ending point based on the maximum water depth value and the minimum water depth value at operation 528 (shown in FIG. 13).

In some embodiments, the method may include additional, optional operations, and/or the operations described above may be modified or augmented. Some examples of modifications, optional operations, and augmentations are described below, as indicated by dashed lines, such as, receiving a user input directed to the chart defining a starting point at operation 508, receiving current position data from a position sensor at operation 510, and correlating the current position data to the chart to define a starting point at operation 512. In some example embodiments, the method may also include determining geographic locations on the chart that correspond to the starting location and the ending location based on at least the third user input defining the ending point at operation 516, and applying depth offset data at operation 518. In an example embodiment, the method may also include determining a continuous geographical area extending between the starting location and the ending location that comprises a water depth that satisfies both the maximum water depth value and the minimum water depth value at operation 520, determining one or more geographic locations on the chart within the geographical area that satisfies both the maximum water depth value and the minimum water depth value at operation 522, determining a predetermined condition between the starting location and the ending location at operation 524, and determining a predetermined distance threshold associated with the predetermined condition at operation 526.

In some example embodiments, the method may also include receiving sonar data from a forward facing sonar transducer at operation 530, determining a sonar measured water depth in front of the vessel based on the sonar return data at operation 532, causing an alert in response to the sonar measured water depth failing to satisfy the minimum depth value or maximum depth value at operation 534, and causing an alert in response to the sonar measured water depth being inconsistent with the depth value of the chart at operation 536, and adjusting the continuous route based on the sonar measured water depth, such that the sonar measured water depth along the continuous route satisfies the minimum water value and the maximum water value at operation 538.

The method may also include determining two or more geographic areas that satisfy both the maximum water depth value and the minimum water depth value that are not connected between the starting location and ending location at operation 540, determining a secondary maximum water depth value or a secondary minimum water depth value at operation 542, determining one or more geographical areas that satisfy the secondary maximum water depth value or the secondary minimum water depth value at operation 544, and determining a continuous route from the starting location to the ending location that traverses the two or more geographical locations that satisfy the maximum water depth value and the minimum water depth value and the one or more geographical areas that satisfy the secondary maximum water depth value or the secondary minimum water depth value at operation 546.

FIGS. 12-14 illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A marine electronic device comprising:
a user interface;
a processor; and
a memory having computer program code stored thereon, the memory and the computer program code are configured to, with the processor, cause the marine electronic device to:
receive, via the user interface, a first user input defining a minimum water depth value for a route on a body of water;
receive, via the user interface, a second user input defining a maximum water depth value for the route, wherein the maximum water depth value is greater than the minimum water depth value;
cause a chart to be displayed on the user interface;
receive, via the user interface, a third user input directed to the chart defining an ending point; and
generate a continuous route from a starting location to an ending location corresponding to the ending point based on the maximum water depth value and the minimum water depth value, wherein generating the continuous route from the starting location to the ending location comprises:
determining two or more geographic areas that satisfy both the maximum water depth value and the minimum water depth value that are not connected to each other along a theoretical route between the starting location and ending location;
determining a secondary maximum water depth value or a secondary minimum water depth value;
determining one or more geographical areas that satisfy the secondary maximum water depth value or the secondary minimum water depth value; and
determining a continuous route from the starting location to the ending location that traverses the two or more geographical locations that satisfy the maximum water depth value and the minimum water depth value and the one or more geographical areas that satisfy the secondary maximum water depth value or the secondary minimum water depth value.

2. The marine electronic device of claim 1, wherein the memory and the computer program code are further configured to, with the processor, cause the marine electronic device to:
determine geographic locations on the chart that correspond to the starting location and the ending location based on at least the third user input defining the ending point.

3. The marine electronic device of claim 2, wherein the memory and the computer program code are further configured to, with the processor, cause the marine electronic device to:
receive, via the user interface, a fourth user input directed to the chart defining a starting point,
wherein determining geographic locations on the chart that correspond to the starting location and the ending location is further based on the fourth user input defining the starting point such that the starting location corresponds to the starting point.

4. The marine electronic device of claim 2, wherein the memory and the computer program code are further configured to, with the processor, cause the marine electronic device to:
receive current position data from a position sensor; and
correlate the current position data to the chart to define a starting point,
wherein determining geographic locations on the chart that correspond to the starting location and the ending location is further based on the current position data defining the starting point such that the starting location corresponds to the starting point.

5. The marine electronic device of claim 1, wherein the memory and the computer program code are further configured to, with the processor, cause the marine electronic device to:
determine a predetermined condition between the starting location and the ending location; and
determine a predetermined distance threshold associated with the predetermined condition,
wherein generating the continuous route from the starting location to the ending location is further based on satisfying the predetermined distance threshold.

6. The marine electronic device of claim 5, wherein the predetermined condition includes at least one of a shore line, a depth change rate greater than a predetermined change threshold, an underwater obstacle, or an overwater obstacle.

7. The marine electronic device of claim 1, wherein generating the continuous route is based on depth data associated with the chart, and wherein the chart includes depth offset data, and
wherein the memory and the computer program code are further configured to, with the processor, cause the marine electronic device to apply the depth offset data to the chart or the minimum depth value and maximum depth value, wherein generating the continuous route from the starting location to the ending location further accounts for the depth offset data.

8. The marine electronic device of claim 1, wherein the memory and the computer program code are further configured to, with the processor, cause the marine electronic device to:
receive sonar data from a sonar transducer, wherein the sonar transducer is mounted to a vessel associated with the marine electronic device;
determine a sonar measured water depth in front of the vessel based on the sonar return data; and
adjust the continuous route based on the sonar measured water depth, such that the sonar measured water depth along the continuous route satisfies the minimum water depth value and the maximum water depth value.

9. A method comprising:
receiving, via a user interface, a first user input defining a minimum water depth value for a route on the body of water;

receiving, via the user interface, a second user input defining a maximum water depth value for the route, wherein the maximum water depth value is greater than the minimum water depth value;

causing a chart to be displayed on the user interface;

receiving, via the user interface, a third user input directed to the chart defining an ending point; and generating, using a processor, a continuous route from a starting location to an ending location corresponding to the ending point based on the maximum water depth value and the minimum water depth value, wherein generating the continuous route from the starting location to the ending location comprises:

determining two or more geographic areas that satisfy both the maximum water depth value and the minimum water depth value that are not connected to each other along a theoretical route between the starting location and ending location;

determining a secondary maximum water depth value or a secondary minimum water depth value;

determining one or more geographical areas that satisfy the secondary maximum water depth value or the secondary minimum water depth value; and determining a continuous route from the starting location to the ending location that traverses the two or more geographical locations that satisfy the maximum water depth value and the minimum water depth value and the one or more geographical areas that satisfy the secondary maximum water depth value or the secondary minimum water depth value.

10. The method of claim 9 further comprising:
determining geographic locations on the chart that correspond to the starting location and the ending location based on at least the third user input defining the ending point.

11. The method of claim 10 further comprising:
receiving, via the user interface, a fourth user input directed to the chart defining a starting point,
wherein determining geographic locations on the chart that correspond to the starting location and the ending location is further based on the fourth user input defining the starting point such that the starting location corresponds to the starting point.

12. The method of claim 9 further comprising:
receiving current position data from a position sensor; and
correlating the current position data to the chart to define a starting point,
wherein determining geographic locations on the chart that correspond to the starting location and the ending location is further based on the current position data defining the starting point such that the starting location corresponds to the starting point.

13. The method of claim 9, wherein generating the continuous route is based on depth data associated with the chart, and wherein the chart includes depth offset data, and
wherein the memory and the computer program code are further configured to, with the processor, cause the marine electronic device to apply the depth offset data to the chart or the minimum depth value and maximum depth value, wherein generating the continuous route from the starting location to the ending location further accounts for the depth offset data.

14. The method of claim 9, wherein the memory and the computer program code are further configured to, with the processor, cause the marine electronic device to:

receive sonar data from a sonar transducer, wherein the sonar transducer is mounted to a vessel associated with the marine electronic device;

determine a sonar measured water depth in front of the vessel based on the sonar return data; and adjust the continuous route based on the sonar measured water depth, such that the sonar measured water depth along the continuous route satisfies the minimum water depth value and the maximum water depth value.

15. The method of claim 9, wherein the memory and the computer program code are further configured to, with the processor, cause the marine electronic device to:

determine one or more pre-selected geographical areas to avoid, wherein the pre-selected geographical areas to avoid were determined based on user input defining the pre-selected geographical areas to avoid; and determine the continuous route to avoid the one or more pre-selected geographical areas to avoid.

16. A marine electronic device comprising:
a user interface;
a processor; and
a memory having computer program code stored thereon, the memory and the computer program code are configured to, with the processor, cause the marine electronic device to:

determine a minimum water depth value for a route on a body of water;

determine a second user input defining a maximum water depth value for the route, wherein the maximum water depth value is greater than the minimum water depth value;

receive, via the user interface, a third user input defining an ending point;

determine a continuous geographical area extending between a starting location and an ending location that comprises a water depth that satisfies both the maximum water depth value and the minimum water depth value, wherein the ending location corresponds to the ending point provided through the third user input; and generate a continuous route from the starting location to the ending location formed of a plurality of geographical locations within the determined continuous geographical area, wherein generating the continuous route from the starting location to the ending location comprises:

determining two or more geographic areas that satisfy both the maximum water depth value and the minimum water depth value that are not connected to each other along a theoretical route between the starting location and ending location;

determining a secondary maximum water depth value or a secondary minimum water depth value;

determining one or more geographical areas that satisfy the secondary maximum water depth value or the secondary minimum water depth value; and determining a continuous route from the starting location to the ending location that traverses the two or more geographical locations that satisfy the maximum water depth value and the minimum water depth value and the one or more geographical areas that satisfy the secondary maximum water depth value or the secondary minimum water depth value.

* * * * *